No. 650,038. Patented May 22, 1900.
J. G. DUDLEY.
GLOBE OR SHADE HOLDER.
(Application filed Oct. 19, 1899.)
(No Model.)
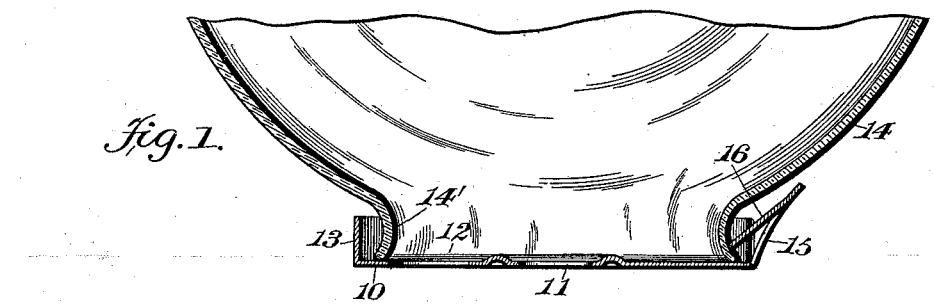
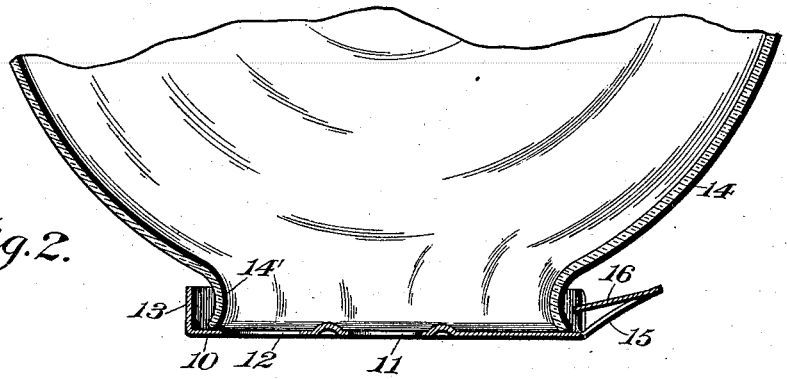
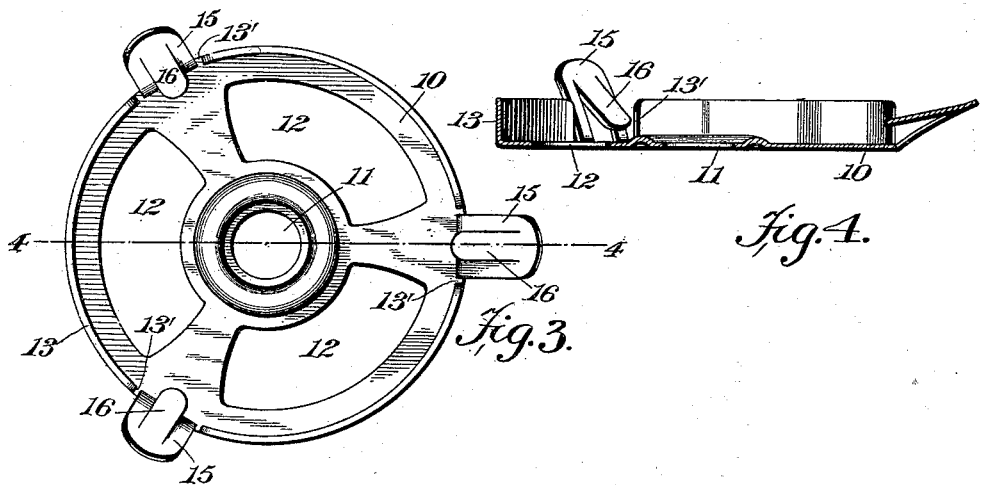
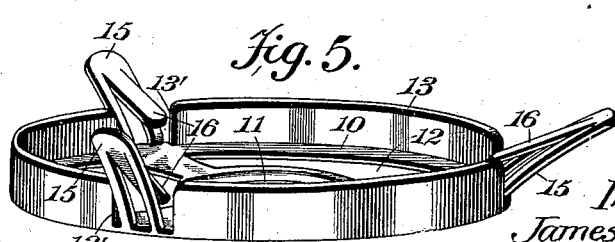
Witnesses:
Inventor:
James G. Dudley,
By his Attorney,
THE NORRIS PETERS CO., PHOTO-LITHO., WASHINGTON, D. C.

UNITED STATES PATENT OFFICE.

JAMES GRIEVE DUDLEY, OF NEW YORK, N. Y.

GLOBE OR SHADE HOLDER.

SPECIFICATION forming part of Letters Patent No. 650,038, dated May 22, 1900.

Application filed October 19, 1899. Serial No. 734,036. (No model.)

*To all whom it may concern:*

Be it known that I, JAMES GRIEVE DUDLEY, a citizen of the United States, residing in New York, (Brooklyn,) in the county of Kings and State of New York, have invented certain new and useful Improvements in Globe or Shade Holders, of which the following is a specification.

This invention relates to holders for globes or shades to be used in connection with gas or other fixtures, and has for its object the provision of an article of this class by means of which a globe or shade may be removably held in place and which may be stamped out of sheet metal and subsequently formed into proper shape to perform its function without the aid of extraneous devices. Articles of this class as heretofore made involved expense and labor which the present invention is designed to avoid, inasmuch as all separate elements—such, for instance, as the usual set-screws and threaded bushings or holding-clamps riveted to the rings, &c.—are dispensed with. In practice the employment of said screws has proved to be a source of great annoyance by virtue of the wear of the threads or by the loss of the screw, in which case the holder is rendered useless. Furthermore, it is a well-known fact that the pressure of the screws against the rim of the globe (if the latter be made of glass) is apt to be too great, and thereby cause breakage of the same. This objection is also present in that form of globe-holder in which a series of downwardly-bent springs is formed from or attached to the rim of the device, which springs are not accessible when the globe is in place and require the aid of screws or other extraneous tools to retract them when it is desired to remove said globe. Hence it is the particular object of this invention to provide a holder which will retain the globe firmly in proper position without in any way interfering with the expansion thereof and which at the same time will render the removal or placing in position of said globe a simple and easy matter. In this connection it may be stated that in order to carry my invention into practice I preferably form the holder of tough or flexible but non-resilient material, so that the retaining members or prongs may be bent into any desired position and will there remain without any tendency of returning to or resuming their previous positions. Furthermore, in order to prevent any distortion of the rim of the device and to facilitate the bending of the retaining-prongs the rim is slitted or cut near the sides of the prongs, as will be clearly described hereinafter and as illustrated in the drawings accompanying and forming part of this specification, in which—

Figure 1 is a central section illustrating the manner in which a shade is held in place on my improved holder. Fig. 2 is a similar view showing one of the prongs bent outward to permit the removal of the shade; and Figs. 3 to 5, inclusive, are detail views of a holder constructed in accordance with my invention, Fig. 3 being a plan view, Fig. 4 a section on line 4 4, Fig. 3, and Fig. 5 a perspective view thereof.

Similar characters of reference designate like parts in all the figures of the drawings.

In the drawings, 10 designates a plate having an aperture 11 for permitting the passage of a burner, (not shown,) to which it may be secured in the usual manner. Openings or apertures 12 are provided in the plate 10 for supplying the necessary amount of air to the burner when lighted, and said plate has a peripheral flange 13, which serves to retain the globe or shade 14 in place thereon. The plate 10 is provided with a series of prongs 15, preferably formed integrally therewith, and each of said prongs has a punched-out inwardly-bent portion or lip 16, the free end of which engages the usual neck 14' of the globe or shade, as shown in Fig. 1.

As shown in Figs. 3 to 5, the flange 13 is cut away at 13' adjacent to the side edges of each of the prongs 15, whereby clearance is provided, and any one of the prongs may be bent back and forth without interference with said flange. Each retaining-lip 16 of the prongs 15 is, as above stated, punched out of, and therefore formed integrally with, the prong, and while these retaining-lips are also practically rigid, yet, as is obvious, they will yield or give sufficiently to accommodate the expansion of the globe.

In operation the device is first secured to the gas or other fixture in the usual manner, and one of the prongs is bent outward to the position shown, for example, in Figs. 2 to 5, inclusive. The globe or shade is then placed upon plate 10 and its flange 14' is inserted beneath two of the lips 16. The third prong 15, with its retaining-lip, is then bent upward by hand and serves, in connection with the other prongs and their retaining-lips, to securely retain said globe upon the plate 10.

By making the prongs 15 of flexible non-resilient material a much better result is accomplished than when said prongs are composed of resilient or spring-like material and the pressure of the lips can be readily regulated upon the globe. Furthermore, in case of expansion of said globe the lips 16 will give or yield sufficiently to prevent breakage of the same, while at the same time retaining their full holding power.

When it is desired to remove the globe for cleansing or other purposes, one of the prongs 15 is bent outward, and it retains its set position until a new globe is again placed upon the plate 10, when said prong is bent upward, retaining its upward set position in the same manner to carry its lip 16 against the globe.

Having described my invention, I claim—

1. A device for retaining globes or shades in position upon their fixtures, consisting of a supporting-plate, and a series of flexible non-resilient prongs having lips normally in position to engage the globe.

2. A device for retaining globes or shades in position upon their fixtures, consisting of a supporting-plate having a series of flexible non-resilient prongs located at intervals thereon, said prongs having lips formed integrally therewith, the free ends of which are normally in position to engage the neck portion of the globe or shade.

3. A device of the class specified, consisting of a supporting-plate having a flange, and a series of prongs each separated by spaces at its sides from said flange, said prongs carrying devices for engaging a globe or shade.

4. A device of the class specified, consisting of a plate having a peripheral flange, and a series of prongs rising from said plate, and each equipped with an integral lip, said prongs being separated at each side edge thereof from said flange.

5. A device of the class specified, consisting of a plate of sheet metal having a series of prongs formed integrally therewith; a flange cut away at intervals to provide clearance-spaces for the movement of said prongs; and a series of lips punched out of said prongs, substantially as and for the purpose specified.

JAMES GRIEVE DUDLEY.

Witnesses:
FRED. J. DOLE,
GEO. A. HOFFMAN.